United States Patent Office 3,780,013
Patented Dec. 18, 1973

3,780,013
PREPARATION OF COLOR IMPROVED TALL OIL ROSIN PENTAERYTHRITOL ESTERS
William Richard Smith, Panama City, Fla., assignor to Arizona Chemical Company, New York, N.Y.
No Drawing. Filed Dec. 18, 1972, Ser. No. 316,148
Int. Cl. C09f 1/04
U.S. Cl. 260—97.5    4 Claims

ABSTRACT OF THE DISCLOSURE

There is provided a process for improving the color of a tall oil rosin pentaerythritol ester by adding a phenol sulfide incrementally to tall oil rosin and pentaerythritol during the said rosin pentaerythritol ester formation.

---

The present invention relates to the esterification of tall oil rosin. More particularly, it relates to the esterification of tall oil rosin with pentaerythritol utilizing incremental additions of a phenol sulfide to improve the color of the esterified tall oil rosin.

As is known normally obtained gum or wood rosin can be readily reacted with pentaerythritol to obtain esters of rosin grade often as light as WG or WW. Unfortunately, tall oil rosin usually obtained by the distillation of tall oil or tall oil fractions, darkens upon esterification with pentaerythritol. Thus, in applications where light color is of any consequence or importance, tall oil rosin cannot be successfully utilized.

It is, therefore, a principal object of the invention to prepare a lightly-colored tall oil rosin ester prepared from the esterification of pentaerythritol. It is a further object of the invention to prepare a tall oil rosin ester of pentaerythritol of rosin grade M or better. Other objects and advantages will become self-evident from a reading of the ensuing disclosure.

According to the process of the present invention, it has been unexpectedly found that tall oil rosin can be esterified with pentaerythritol in the presence of both an esterification catalyst and a phenol sulfide. The latter is added incrementally during the esterification. If the latter phenol sulfide be added all at once either prior to or simultaneous with the esterification reaction, a light colored esterified product is not realized. Rather, a darkened rosin ester is attained.

The rosin color standards referred to herein are U.S.D.A. standards varying from X, the lightest, to the darkest color. The scale of colors is designed as X, WW, WG, N, M, K, I, H, G, F, E, and D.

In general, any tall oil rosin can be esterified with pentaerythritol in the presence of an esterification catalyst usually at temperatures ranging from 250° C. to 300° C. for from about five to ten hours. Any esterification catalyst such as calcium hydroxide or zinc oxide, can be so employed. Advantageously, the phenol sulfide is added incrementally, usually at the rate of from 0.02% to 0.08% during the first hour and at from 0.005% to 0.015% per hour thereafter, said percentages being by weight of the tall oil rosin being esterified. The phenol sulfide is set forth in U.S. Pat. No. 3,377,333 which is incorporated by reference herein as stated in the aforementioned patent, the treating agent may be represented by the structure:

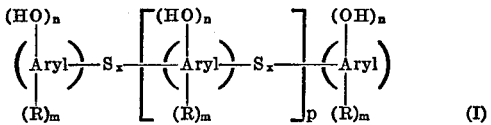

(I)

where $n$ is an integer from 1 to 3 inclusive, $p$ is an integer from 0 to 100 and preferably about 5 to 20 inclusive, and the sum of $m$ and $n$ on each aryl is between 1 and 5 inclusive, $x$ is 1, 2 or 3, and R is a hydrocarbon group, e.g., alkyl cycloalkyl and substituted alkyl, e.g., $C_1$–$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms, inclusive, typically phenyl, naphthyl and anthracyl. Typical cycloalkyl groups contain 3–8 carbon atoms in the ring, e.g., cyclopropyl, cyclopentyl and cyclohexyl.

In structure (I) above when aryl is phenol it will be apparent that when $p$ is 0 the sum of $m$ and $n$ on each phenyl ring will not be more than 5 and when $p$ is 1 or higher the sum of $m$ and $n$ on each phenyl ring will not be more than 4. It will also be apparent, however, that the sum of $n$ and $m$ may range higher when aryl is naphthyl or anthracyl, since when $p$ is 0 or at least 1 more than 5 or 4 sites, respectively, are available for OH and R substituents. The values for $m$, $n$, $x$ and $p$, except when 0, are positive, whole numbers.

Included are compounds and position isomers having R groups of mixed character, i.e., the R group or groups on one aryl ring may differ from the R group or groups on the other aryl ring; $m$ and $n$ may be the same or different for each aryl ring; and when more than one R group is present on an aryl ring, such groups may be identical or different.

As typical and non-limiting examples of the treating agents may be mentioned:

Thiobis naphthols, e.g.,
1,1'-thiobis(β-naphthol)
2,2'-thiobis(α-naphthol)
2,2'-thiobis phenols, e.g.,
2,2'-thiobis(4-methyl-6-tert.-butylphenol)
2,2'-thiobis(4,6-dimethylphenol)
2,2'-thiobis(4,6-di-tert.-butylphenol)
2,2'-thiobis(4-ethyl-6-tert.-butylphenol)
2,2'-thiobis(4-n-propyl-6-amylphenol)
2,2'-thiobis(4-methyl-6-n-octylphenol)
2,2'-thiobis(4-amyl-6-tert.-octylphenol)
2,2'-thiobis(4-methyl-6-n-decylphenol)
2,2'-thiobis(4-methyl-6-laurylphenol)
2,2'-thiobis[4-methyl-6-(1-methylcyclohexyl)phenol]
2,2'-thiobis[4-methyl-6-(1-methylbenzyl)phenol]
2,2'-thiobis(4-methylphenol)
2,2'-thiobis(6-tert,-butylphenol)
2,2'-thiobis(4,6-dilaurylphenol)
2,2'-thiobis(4,6-distearylphenol)
3,3'-thiobisphenols, e.g.,
3,3'-thiobis-[methyl-6-(1,1,3,3-tetramethylbutyl)phenol]
3,3'-thiobis-(methyl-6-t-dodecylphenol)
3,3'-thiobis(pentadecyl-t-butylphenol)
4,4'-thiobis phenols, e.g.,
4,4'-thiobis(3-methyl-6-tert.-butylphenol)
4,4'-thiobis[3-methyl-6-(1-methylcyclohexyl)phenol]
4,4'-thiobis(2-methyl-6-tert.-butylphenol)
4,4'-thiobis(3,6-dimethylphenol)
4,4'-thiobis(3,6-di-tert.-butylphenol)
4,4'-thiobis(3-ethyl-6-tert.-butylphenol)
4,4'-thiobis(3-n-propyl-6-amylphenol)
4,4'-thiobis(3-methyl-6-n-octylphenol)
4,4'-thiobis(3-amyl-6-tert.-octylphenol)
4,4'-thiobis(3-methyl-6-n-decylphenol)
4,4'-thiobis(3-methyl-6-laurylphenol)
4,4'-thiobis(3,6-dilaurylphenol)
4,4'-thiobis(3,6-distearylphenol)
4,4'-thiobis[3-methyl-6-(1-methylcyclohexyl)phenol]
4,4'-thiobis[3-methyl-6-(1-methylbenzyl)phenol]
4,4'-thiobis(2-tert.-butylphenol)

4,4'-thiobis[2-methyl-6-(1-methylcyclohexyl)phenol]
4,4'-thiobis[2-methyl-6-(1-methylbenzyl)phenol]
4,4'-thiobis(2-methyl-6-tert.-butylphenol)
4,4'-thiobis(2-tert.-butylphenol)
4,4'-thiobis(2-methyl-6-laurylphenol)
4,4'-thiobis(2,6-distearylphenol)
4,4'-thiobis[2,6-di(α-methylbenzyl)phenol]
4,4'-thiobis[2,6-di(α,α-dimethylbenzyl)phenol]
4,4'-thiobis[3-(α-methylbenzyl)-6-(α,α-dimethylbenzyl) phenol]

Thiobis-polyhydroxy compounds, e.g.,
4,4'-thiobis(resorcinol), 5,5'-thiobis(pyrogallol), the di- and trithiobis variants of any of the foregoing, and higher molecular weight material corresponding to the repeating unit of any of the foregoing. These and other like compounds are disclosed, for example, in U.S. Pats. No. 2,670,382; 2,670,383; 2,841,619; 3,060,121; 3,069,384; 3,157,517; 3,211,794 and Compt. rend. 198, 1791-3 (1934), said disclosures being incorporated herein by reference.

The invention may be better understood by referring to the examples provided below which are to be taken as merely illustrative. Unless otherwise specified, the parts and percentages are by weight.

EXAMPLE 1

This example illustrates tall oil rosin pentaerythritol ester formation absent the incorporation of a phenol sulfide added during the esterification procedure.

To a suitable reaction vessel equipped with stirrer, and thermometer are added 100 parts of tall oil rosin having a color of WW. There are next added 12 parts of pentaerythritol and 0.05% calcium hydroxide as the catalyst, based on the weight of the tall oil rosin. The mixture is finally heated to 275° for eight hours.

Resultant tall oil rosin pentaerythritol ester is found to have the color: I as measured against U.S.D.A. rosin standards.

EXAMPLE 2

This example illustrates the formation of gum or wood rosin pentaerythritol ester formation.

Repeating the procedure of Example 1 in every detail except that gum rosin having a color of WW is esterified with pentaerythritol The color of the resultant ester is found to be unaffected by esterification.

Wood rosin of WW grade is substituted for gum rosin in the above example. No color change is noted subsequent to pentaerythritol esterification.

EXAMPLE 3

The procedure of Example 1 is followed in every detail except that the phenol sulfide, 2,2'-thiobis (4-methyl-6-tert.-butyl) phenol is added incrementally during esterification, initially at 0.02% for the first hour and thereafter at the rate of 0.01% per hour for the next seven hours.

Resultant tall oil rosin pentaerythritol ester has good color measuring M-N on the United States Department of Agriculture (USDA) scale.

EXAMPLE 4

Repeating the procedure of Example 3 in every detail except that the phenol sulfide is added all at once immediately prior to esterification. The resultant product has a rosin color of K. which is darker than the tall oil rosin pentaerythritol ester of Example 3.

EXAMPLE 5

To a suitable reaction vessel are added 100 parts of tall oil rosin having a color of WG, 12 parts of pentaerythritol and 0.04% zinc oxide, based on the weight of the tall oil rosin. The mixture is next heated to 280° C. for seven and one-half hours while adding incrementally 1,1-thiobis (β-naphthol). The latter is added at the rate of 0.03% for the first hour and 0.01% per hour for the next six and one-half hours.

Resultant tall oil rosin pentaerythritol ester so obtained has a color of M, whereas the color of the ester produced by omitting the phenol sulfide is H.

I claim:
1. In the esterification of tall oil rosin with pentaerythritol and esterification catalyst for from five to ten hours, the improvement which comprises: carrying out the esterification in the presence of incremental additions of a treated compound of the structure:

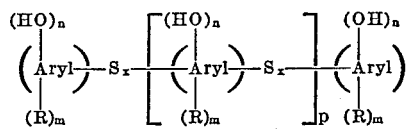

wherein $n$ is an integer from 1 to 3, $p$ is an integer from 0 to 100, $x$ is 1 to 3, the sum of $m$ and $n$ on each aryl is from 1 to 5, aryl is selected from the group consisting of phenyl, naphthyl, and anthracyl, and R is a hydrocarbon radical of 1 to 22 carbon atoms, said treating compound being added at a rate ranging from 0.02% to 0.08% during the first hour and from 0.005% to 0.015% per hour thereafter, the percentages being by weight based on the tall oil rosin present.

2. The method of claim 1 wherein the treating compound is 2,2'-thiobis(methyl-6-t-butylphenol).

3. The method of claim 1 wherein the treating compound is 1,1'-thiobis(β-naphthol).

4. The method of claim 1 wherein the treating compound is added until the esterification indicated has been substantially completed.

References Cited
UNITED STATES PATENTS

| | | | |
|---|---|---|---|
| 3,423,389 | 1/1969 | Wheelys | 260—97.5 |
| 3,324,087 | 6/1967 | Smith | 260—79.3 R |

DONALD E. CZAJA, Primary Examiner

W. E. PARKER, Assistant Examiner

U.S. Cl. X.R.

260—104